DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 7

T940,009

MEASUREMENT OF BURNABLE POISON ABSORPTIONS AND CRITICAL ASSEMBLIES

Alvin Radowsky, Tel Aviv, Israel, assignor to the United States of America as represented by the United States Atomic Energy Commission

Filed May 23, 1974, Ser. No. 472,926
**Int. Cl. G21c *17/00***
U.S. Cl. 176—19 R
1 Sheet Drawing. 8 Pages Specification

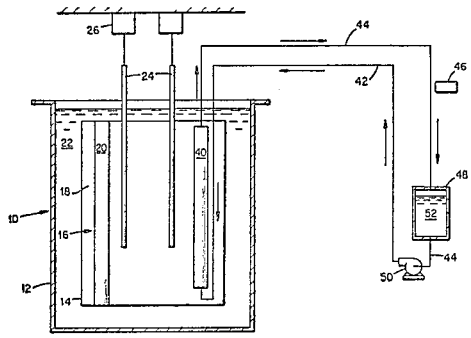

A method and apparatus is described for measuring the neutron absorption characteristics of burnable poison elements within a nuclear reactor. A container of the same size and shape of the burnable poison element is located within the core and connected to inlet and outlet lines, mixing tank means, a pump, and a counting system such that various solutions having concentrations of the burnable poison may be circulated through the reactor to determine various burnable poison absorption characteristics without shutting down the reactor.

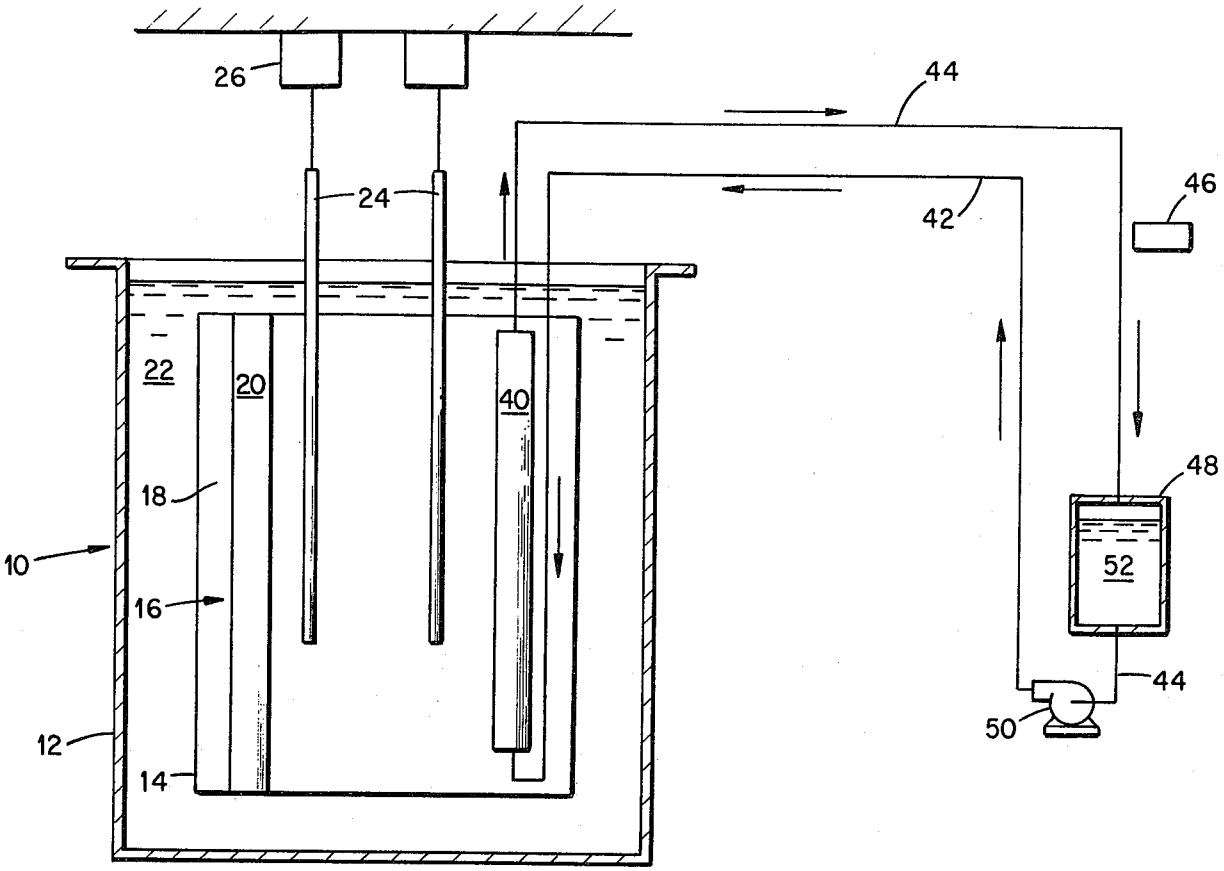

MEASUREMENT OF BURNABLE POISON ABSORPTIONS AND CRITICAL ASSEMBLIES
Original Filed May 23, 1974